United States Patent [19]

Coventry et al.

[11] Patent Number: 5,300,562

[45] Date of Patent: Apr. 5, 1994

[54] PROCESS FOR PREPARING PHENOLIC BINDER

[75] Inventors: Kathleen H. Coventry, Exton, Pa.; David A. Segal, Hot Springs, Ark.

[73] Assignee: CertainTeed Corporation, Valley Forge, Pa.

[21] Appl. No.: 74,037

[22] Filed: Jun. 8, 1993

Related U.S. Application Data

[63] Continuation-in-part of Ser. No. 740,599, Aug. 5, 1991, abandoned, which is a continuation-in-part of Ser. No. 697,765, May 9, 1991, abandoned.

[51] Int. Cl.[5] .................. C08L 61/10; C08K 5/21; C08K 3/28; C08G 8/10
[52] U.S. Cl. ........................... 524/841; 524/596; 524/598; 528/164
[58] Field of Search ............... 524/594, 596, 598, 841; 528/162, 164

[56] References Cited

U.S. PATENT DOCUMENTS

| | | | |
|---|---|---|---|
| Re. 30,375 | 8/1980 | Deuzeman et al. | 524/594 |
| 2,676,898 | 4/1954 | Folger et al. | 428/221 |
| 2,937,159 | 5/1960 | McKay et al. | 524/252 |
| 3,207,652 | 9/1965 | Shannon | 521/181 |
| 3,432,453 | 3/1969 | Gladney et al. | 524/596 |
| 3,624,247 | 11/1971 | Gladney et al. | 524/494 |
| 3,704,199 | 11/1972 | Smucker | 428/221 |
| 3,932,334 | 1/1976 | Deuzeman et al. | 524/841 |
| 3,935,139 | 1/1976 | Ashall | 524/196 |
| 3,956,205 | 5/1976 | Higginbottom | 524/164 |
| 4,028,367 | 6/1977 | Higginbottom | 528/162 |
| 4,294,879 | 10/1981 | McHenry | 524/598 |
| 4,408,003 | 10/1983 | Robinson et al. | 524/364 |
| 4,433,120 | 2/1984 | Chiu | 525/501 |
| 4,650,825 | 3/1987 | Jellinek et al. | 524/841 |
| 4,663,418 | 5/1987 | Jellinek et al. | 524/596 |
| 4,663,419 | 5/1987 | Fugier et al. | 524/596 |
| 4,680,058 | 7/1987 | Shimizu et al. | 523/160 |
| 4,757,108 | 7/1988 | Walisser | 524/596 |
| 4,873,270 | 10/1989 | Aime et al. | 524/35 |
| 4,904,516 | 2/1990 | Creamer et al. | 528/162 |

FOREIGN PATENT DOCUMENTS 0905393  7/1965  United Kingdom .

OTHER PUBLICATIONS

R. W. Martin, "The Chemistry of Phenolic Resins", (John Wiley & Sons, Inc. New York, 1956) pp. 88–97.

*Primary Examiner*—Paul R. Michl
*Assistant Examiner*—Peter Szekely
*Attorney, Agent, or Firm*—Paul and Paul

[57] ABSTRACT

A phenolic binder for glass fibers is prepared using an aqueous mixture including a phenol-formaldehyde resole resin, modified with urea in the presence of ammonia. The urea and ammonia are added after the basic mixture including the resole resin has been neutralized. The urea-modified resole resin shows greater stability than urea-modified resins prepared without ammonia.

15 Claims, No Drawings

PROCESS FOR PREPARING PHENOLIC BINDER

This is a continuation of application Ser. No. 07/740,599, filed Aug. 5, 1991 now abandoned, which is a continuation-in-part of Ser. No. 07/697,765 filed May 9, 1991, now abandoned.

BACKGROUND OF THE INVENTION

1. Field of the Invention

The present invention relates to the manufacture of fiberglass insulation materials, and more particularly to the preparation of phenolic binders for glass fibers.

2. Brief Description of the Prior Art

Aqueous dispersions of phenol-formaldehyde resole resins are frequently used in the manufacture of glass fiber insulation materials, such as insulative batts for walls, in roofs and ceilings, insulative coverings for pipes, and the like. Typically, after glass fiber has been formed, the still hot fiber is sprayed with aqueous binder dispersion in a forming chamber or hood, with the fibers being collected on a conveyer belt in the form of a wool-like mass associated with the binder. In some cases, a glass fiber web is sprayed with the aqueous dispersion. Urea-modified resole resins have been employed for this purpose, the urea contributing to the "punking" resistance of the binder (i.e., resistance to exothermic decomposition at elevated temperatures), and reducing volatiles liberated when the resin is cured at elevated temperature.

Frequently, in the manufacture of glass fiber insulation materials, the aqueous resole resin is prepared in advance of the preparation of the binder, or is supplied by a resin manufacturer, and stored until shortly before use. The resole is typically prepared by reaction of phenol and formaldehyde under basic conditions, the resulting reaction mixture being neutralized to a slightly basic pH by addition of a strong acid. Subsequently, the binder is prepared by adding to the resole resin urea, an acid catalyst for curing the resin and water to dilute the dispersion, and optionally other components, such as a silane glass-adhesion promoter and oil emulsion lubricant.

Preferably the binder is prepared by prereaction of the resole resin with urea at around ambient temperature to give a "premix" for the binder. Just before use, the binder is prepared by adding the remaining components.

The prereaction of the urea with the resole resin to form a premix presents logistical difficulties. In addition to storage facilities for the resole resin, urea and binder, additional facilities are needed for the premix. The timing of the preparation is also more complicated. In some cases, premix is preferably allowed to prereact for a minimum period after mixing and before the binder is prepared. Therefore, the demand for binder must be correctly anticipated to insure an adequate amount of premix is available, while avoiding a wasteful excess.

Ideally, all necessary urea would be added to the resole resin at the time of resin manufacture. This urea-modified resole resin would result in a simplified binder preparation without the logistical difficulties involved with premix preparation.

However, preparation of the urea-modified resole resin may result in downstream process difficulties, specifically the partial cure of the binder is manifested by reduction in the loft of the glass fiber mat just before the mat enters the curing oven and a tacky, over-dry feel to the mat. Further, the modification of the resole resin with the urea reduces the stability of the resin. There is a need for an improved process for preparing an urea-modified resole resin with greater stability, with significantly reduced precure of the resultant urea-modified resole resin-based binder, and enhanced shelf life.

The use of urea and ammonia as formaldehyde scavengers prior to neutralization of two-stage phenol-formaldehyde condensation resin is disclosed in U.S. Pat. No. 3,956,205. U.S. Reissue Pat. No. 30,375 discloses the use of ammonia to raise the pH of a binder including a resole resin, urea and an acid catalyst for elevated temperature cure of the binder. U.S. Pat. No. 4,757,108 discloses a phenolic resole-urea composition made by reaction of urea with the free formaldehyde in the phenolic resole resin under acid conditions, the composition subsequently being made neutral or slightly basic by further addition of urea.

SUMMARY OF THE INVENTION

The present invention provides an improved process for preparing a phenolic binder for glass fibers. This process includes preparation of a water-soluble phenol-formaldehyde resole resin modified with urea. The storage stability of the modified resole prepared by the process of the present invention is unexpectedly significantly greater than that of urea-modified phenolic resins prepared by prior art processes. In addition, the present process unexpectedly significantly reduces precure and extends the shelf life of a binder prepared using the modified resole resin of the present invention.

The process of this invention comprises preparing a phenol-formaldehyde resole resin which preferably has a formaldehyde-to-phenol mole ratio of from about 2.5:1 to 4.2:1. Preferably, an aqueous mixture of formaldehyde and phenol is maintained at a first temperature of from about 40° C. to 50° C. as a basic polymerization catalyst, such as sodium hydroxide, is added. The temperature is then preferably permitted to rise to a second temperature between from about 60° C. and 80° C. over a period of about thirty minutes. This second temperature is preferably maintained until the free formaldehyde content of the aqueous mixture drops to about 40 percent by weight of the free formaldehyde in the starting mixture. Then the mixture is preferably cooled to a temperature between about 20° C. and 30° C., and the aqueous mixture is preferably neutralized, such as by addition of sulfuric acid, preferably to a pH from about 7.2 to 7.6.

In contrast to the two stage process disclosed in U.S. Pat. No. 3,956,205, the process of the present invention is preferably a single stage process and does not employ two or more stages.

The phenol-formaldehyde resole resin is preferably prepared by a basic process not including acid and catalyzed step.

After the aqueous mixture has been neutralized, two nitrogenous reactants, preferably ammonia and urea, are added to form a reaction mixture to provide a modified resin. The ammonia is preferably added in a quantity sufficient to give a weight ratio of ammonia (based on NH3) to resin solids (that is, the solids due to the unmodified resole resin) in the modified resin of from about 1.0:100 to 3.0:100. It is preferred that the phenol-formaldehyde resin have a formaldehyde-to-phenol mole ratio of from about 3.2:1 to 4.0:1. Preferably, the mole ratio of the urea added to the free formaldehyde in the aqueous mixture including the phenol-formaldehyde resin is from about 1:1 to 1.75:1.

Preferably, the ammonia and the urea are added at the time of manufacture of the resole resin, but may be added shortly after the aqueous mixture is neutralized, such as within about three days after neutralization. In this case, the aqueous mixture including the resole resin is preferably stored at a temperature of about 40–55° F. after neutralization.

Advantageously and unexpectedly the modified resole resin prepared by the process of this invention can be stored for up to about two weeks at a temperature up to about 50° F. without loss of important application properties.

In completing preparation of the aqueous mineral fiber binder composition, other typical binder components, such as an acid elevated temperature cure catalyst, a mineral oil lubricant, and an organo-silane adhesion promoter, can be added to the aqueous mixture of the modified resole. Such components can be added to the aqueous mixture of modified resole resin shortly before application of the binder to the glass fibers.

In comparison with an otherwise similar single step process in which ammonia is omitted, the binder prepared by the present process exhibits reduced precure and consequently improved performance properties.

DETAILED DESCRIPTION OF THE PREFERRED EMBODIMENTS

The phenol-formaldehyde resole resin employed in the process of the present invention can be prepared by conventional methods known in the art, such as those which give water-soluble resole resin and employ commercial grade phenol and formaldehyde materials. In addition to phenol itself, other hydroxy-functional aromatic compounds can be employed, or used in addition to phenol. Similarly, other reactive aldehydes can be substituted in whole or in part for formaldehyde to produce the aqueous solution of water soluble resole resin. The preparation of such resole resins is reviewed and described in R. W. Martin, *The Chemistry of Phenolic Resins* (John Wiley & Sons, Inc., New York, 1956) at 88–97.

In a presently preferred embodiment, the process of this invention includes preparation of a water-soluble phenol-formaldehyde resole resin. A base-catalyzed condensation of the phenol and the aldehyde is typically used to prepare the resin. The reaction, which is exothermic, is initiated after mixing the phenol and the aldehyde by addition of the catalyst.

The proportion of phenol to the aldehyde is selected to yield a resole-type resin (stoichiometric excess of formaldehyde) when formaldehyde and phenol are used, the mole ratio of formaldehyde to phenol preferably being from about 2.5:1 to 4.2:1, and more preferably from about 3.2:1 to 4.0:1. Preferably, an aqueous mixture of formaldehyde and phenol is maintained at a first temperature of from about 40° C. to 50° C. as a basic polymerization catalyst is added.

The catalyst used in the process of preparing the resole resin can include at least one basic alkali metal or alkaline earth metal base. Examples of alkali metal bases which can be used include the hydroxides of sodium, potassium, and lithium. Examples of alkaline earth metal bases which can be used include the oxides and hydroxides of calcium, barium and strontium, such as calcium oxide and calcium hydroxide. Potassium hydroxide or sodium hydroxide is preferred over calcium hydroxide, as the alkali metal bases appear to provide greater stability than calcium hydroxide in the present process. Other strongly basic water-soluble substances which do not react with formaldehyde, such as tertiary amides and the like, can also be used in catalyzing the preparation of the resole resin.

The temperature is then preferably permitted to rise the first temperature to a second temperature between about 60° C. and 80° C. The time required for the temperature rise to occur depends on the scale on which the exothermic reaction is being carried out. On a production scale, this temperature rise can occur over a period of about thirty minutes. If desired, the reaction vessel can be cooled to slow the temperature increase.

This second temperature is preferably maintained until the free formaldehyde content of the aqueous mixture drops by about 65 percent of the initial free formaldehyde level and more preferably by about 60 percent of the initial free formaldehyde level, by weight. Without being bound by any specific explanation of the process, it is believed that the slightly higher residual free formaldehyde content (60 percent decrease versus 65 percent decrease) enhances the storage stability of the modified resin. The actual decrease is affected by the starting formaldehyde-to-phenol ratio. Next, the aqueous mixture is cooled, preferably to a temperature between about 20° C. and 30° C., and the aqueous mixture is neutralized, such as by addition of a strong acid such as sulfuric acid, preferably to a pH from about 7.2 to 7.6.

Typically, the process is selected to provide an aqueous resole resin with total solids of about 40 to 50 percent by weight. The aqueous resole resin can also include small amounts of residual formaldehyde, such as up to about 15 percent by weight, and small amounts of residual phenol, such as up to about 2 percent by weight. In addition, the aqueous resole resin will typically contain small amounts of residual sodium, calcium or like salts from the resin polymerization.

After preparation of the aqueous resole resin has been completed, the aqueous resin can be packaged, as by drumming, and stored until needed or transferred to a transportation vehicle such as a tank wagon or rail car and shipped to another site where binder for mineral fiber articles is to be produced.

In a presently preferred embodiment of the present invention, the aqueous resole resin is modified at the resin manufacturing site by including two nitrogenous reactants, preferably urea and ammonia.

The aqueous resole resin produced is used to prepare an aqueous binder for articles formed using mineral fibers by the process of the present invention. Typically, in such articles, the mineral fibers, such as glass fibers, are initially formed into a non-woven mat. An aqueous binder including the urea-modified resole resin is typically sprayed on newly formed, still hot, glass fibers in a forming chamber or like apparatus to yield a wool-like mass including the glass fibers, bound by the modified resin binder. The characteristics and utility of the article produced are determined to some extent by the type of mineral fiber used, the length and diameter of the fibers, the density, oxidation, and concentration of the fibers in the mat, and the like. For some applications, it may be desirable to weave the fibers or otherwise form a fabric from the fibers.

The aqueous binder is typically prepared in prior art processes by first mixing the aqueous phenol-formaldehyde resole resin with a single nitrogenous coreactant, preferably urea, and by addition of water to adjust the solids, to give a premix.

In the process of the present invention, two or more nitrogenous reactants are used in forming a modified phenolic resole resin to be used in lieu of a "premix."

One nitrogenous component used in the reaction is ammonia. The other nitrogenous reactant can be any nitrogenous substance known in the art to act as a curing agent for phenol-formaldehyde resole resins. Examples of nitrogenous reactants which can be used include urea, thiourea, dicyandiamide, melamine, melamine-formaldehyde resins, and dicyandiamide-formaldehyde resins. Preferably, two nitrogenous reactants are mixed with the aqueous resole resin, the first nitrogenous reactant being ammonia, the second nitrogenous reactant preferably being urea. Preferably, the weight ratio of the ammonia to the unmodified resole resin is from about 1.0:100 to 3.0:100. Preferably, the second nitrogenous reactant is added in an amount sufficient to react with substantially all residual formaldehyde in the resole resin. When urea is the second nitrogenous reactant, the mole ratio of urea to the free formaldehyde in the aqueous mixture including the resole resin is preferably from about 1:1 to 1.75:1. On mixing the nitrogenous reactants with the aqueous resole resin, an increase in the basicity of the aqueous mixture is observed, such as an increase in pH from a range of 7.2 to 7.6 to a range of 8.2 to 8.6. In a presently preferred embodiment of the present process, the urea and ammonia are added directly to the aqueous resole mixture, after the aqueous mixture has been neutralized, and preferably no more than about three days after the neutralization of the reaction mixture. Advantageously, the urea and ammonia can be added just after the neutralization. Preferably, the aqueous reaction mixture thus provided is agitated for at least a time sufficient to ensure complete mixing of the resole resin, the urea, and the ammonia, such as for at least about 30 to 60 minutes, using conventional liquid mixing equipment. If the neutralized aqueous mixture including the resole is stored for a period before the nitrogenous reactants are added, it is 0 preferred that the aqueous mixture be stored at a temperature below ambient, such as from about 40 to 55° F.

The urea-modified phenolic resin prepared by the presently preferred embodiment of the present invention has a storage stability of at least about two weeks at temperatures up to at least about 50° F.

The process of the present invention can further include subsequently completing preparation of the binder by adding a catalyst, such as a latent acid catalyst, for curing the urea-modified resole resin.

Examples of catalysts for curing the urea-modified resole resin include acid catalysts such as salts, preferably ammonium or amino salts of acids, such as ammonium sulphate, ammonium phosphate, ammonium sulfamate, ammonium carbonate, ammonium acetate, ammonium maleate, and the like. The acid catalyst can be added in an amount of from about 0.1 to 5 percent by weight based on the weight of the resole resin and the urea.

Completing preparation of the binder can also include addition of a lubricant composition, such as a mineral oil emulsion, and a material promoting adhesion of the modified resole resin to the glass fibers, such as a suitable silane. An example of an adhesion-improving silane which can be added is 3-aminopropyl triethoxysilane. Other additives such as finely divided mineral fibers, non-reactive organic resins such as Vinsol (trademark of Hercules) resin (derived from rosin), tall oil, surface active compounds such as lignosulfonate salts, thickeners and rheology control agents, dyes, color additives, water, and the like, can also be added to the aqueous binder.

The aqueous binder prepared by the process of the present invention has improved stability giving a shelf life of at least about 24 hours and reduced precure in comparison with binders prepared using urea as the sole nitrogenous reactant.

Prior to application of the binder, the binder can be diluted by addition of water to provide a concentration suitable for application to the hot mineral fibers or mineral fiber web or mat. For example, water can be added to provide a total solids content of from about 1 to 80 percent by weight.

The aqueous binder can be applied directly to newly formed, still hot glass fibers, or to a mineral fiber mat or fabric, and subsequently dried and cured to form an article. The mineral fiber can be a glass fiber, and the mat can be a non-woven mat. The mineral fibers can be continuous or chopped or can take the form of a mineral fiber wool. When glass fiber is used, it can be formed by any conventional process, such as by flame or steam blowing, by centrifugal fiberizing, or the like. The shape, fiber, density, fiber lengths, fiber orientation, and like characteristics of the fiber mat depend on the application intended for the articles produced. One especially important application is thermal insulation. In this case, the fiber mats take the form of continuous rolls or batts of non-woven, randomly oriented glass fibers. A similar mat is used in the production of glass fiber batts for acoustic insulation.

When thermal and acoustic glass fiber insulation is to be produced, the newly formed, still hot glass fibers are typically sprayed in a forming chamber or hood with the aqueous binder to distribute a coating of binder over the fibers, and especially at contact points between fibers. Subsequently, the mat coated with the aqueous binder solution can be thermally dried to remove water, if the hot fibers do not have sufficient heat content to drive off the water. In either case, the resinous compounds including the resole and the nitrogenous reactant are cured to form an infusible binder for the mineral fiber mat. The process of the present invention can also be used to prepare binders for other mineral fiber articles such as battery separators, printed circuit boards, and electrical insulation products as well as for processed wood products such as chipboard, particle board, plywood, and the like.

The following examples are illustrative of the processes, compositions, and articles of the present invention, and will be useful to those of ordinary skill in the art in practicing the invention. However, the invention is in no way limited by these examples. Unless otherwise indicated all percentages are given on a weight basis in the following examples.

EXAMPLES 1 and 2

100 parts of commercial grade phenol and 255 parts of a 50% (w/w) aqueous solution of formaldehyde are introduced into a reactor. The reactor is heated and the contents are agitated until the temperature of the mixture stabilizes at 45° C. The temperature is maintained at a first temperature of 45° C. and 10 parts of 50% sodium hydroxide (w/v) is added at a steady rate over a thirty minute period. The temperature is then permitted to rise to a second temperature of 70° C., within thirty minutes, and this second temperature is maintained for 90 minutes. The reaction mixture is cooled to a third temperature, namely 24° C. in 15 minutes. The pH of the resin is adjusted by addition of 17.5 parts of a 25% (w/w) aqueous solution of sulfuric acid to give a pH of 7.2. Subsequently, 13.6 parts aqueous 29% ammonia solution and 107.0 parts prilled urea are added to the resole resin with agitation to provide an aqueous mixture of urea-modified resole resin (Example 1). The final pH is 7.93.

The process is repeated except that the time at the second temperature, namely 70° C., is 100 minutes (Ex. 2). The process is again repeated, except that no ammonia is added (Comparative Example 1).

All aqueous resins were stored at 55° F. Example 1 and Comparative Example 1 each had stability (defined as no visual fall-out) for 2.5 weeks. Example 2 had stability for 2.0 weeks.

Example 1 and Comparative Example 1 were used to prepare binders by addition of an acid catalyst. Thermal analysis by differential scanning calorimetry showed considerable precure for Comparative Example 1. The binder prepared using the resin of the present process showed minimal precure.

Various modifications can be made in the details of the various embodiments of the processes, compositions and articles of the present invention, all within the scope and spirit of the invention and defined by the appended claims.

We claim:

1. A process for preparing a phenolic binder for glass fibers, the process comprising:
    a) preparing a water-soluble phenol-formaldehyde resole resin in a single stage process by:
        1) preparing an initial aqueous mixture including formaldehyde and phenol;
        2) maintaining the aqueous mixture at a first temperature of from about 40° C. to 50° C. while adding a basic polymerization catalyst;
        3) permitting the temperature of the aqueous mixture to rise to a second temperature between from about 60° C. and 80° C.;
        4) maintaining the aqueous mixture at the second temperature during reaction of the phenol and formaldehyde to form the water-soluble phenol-formaldehyde resole resin until the free formaldehyde content of the aqueous mixture drops to a predefined level;
        5) cooling the aqueous mixture to a third temperature between 20° C. and 30° C.; and,
        6) neutralizing the aqueous mixture;
    b) preparing an aqueous reaction mixture including the phenol-formaldehyde resole resin, urea, and ammonia, the phenol-formaldehyde resole resin being prepared by a basic process not including an acid-catalyzed step;
    c) permitting the urea to react with the phenol-formaldehyde resole resin in the presence of the ammonia by waiting at least about 30 minutes after mixing the urea and the resole resin to form a modified resin; and,
    d) subsequently completing preparation of the binder by adding a catalyst for curing the modified resole resin.

2. A process according to claim 1 wherein the phenol-formaldehyde resin has a formaldehyde-to-phenol mole ratio of from about 2.5:1 to 4.2:1.

3. A process according to claim 2 wherein the phenol-formaldehyde resin has a formaldehyde-to-phenol ratio of from about 3.2:1 to 4.0:1.

4. A process according to claim 1 wherein the predefined level is about 40 percent by weight of the free formaldehyde in the initial aqueous mixture.

5. A process according to claim 1 wherein the ammonia is added in sufficient quantity to give a weight ratio of ammonia to solids of unmodified resin of from about 1.0:100 to 3.0:100.

6. A process according to claim 1 wherein the aqueous mixture including the unmodified resole resin is neutralized to a pH from about 7.2 to 7.6.

7. A process according to claim 1 wherein the mole ration of the urea to the free formaldehyde of the phenol-formaldehyde resin is from about 1:1 to 1.75:1.

8. A process according to claim 1 wherein the aqueous mixture is agitated for at least a time sufficient to ensure complete mixing of the resole resin, the urea, and the ammonia.

9. A process according to claim 1 wherein the aqueous mixture is maintained at a temperature of from about 5° C. to 30° C. while permitting the urea to react with the resole resin in the presence of the ammonia.

10. A process according to claim 1 wherein completing preparation of the binder further includes adding a mineral oil lubricant and an organo-silane adhesion promoter to the aqueous mixture including the modified resole resin.

11. An improved binder for glass fibers prepared according to the process of claim 1.

12. A process for preparing a phenolic binder for glass fibers, the process comprising:
    a) preparing a water-soluble phenol-formaldehyde resole resin in a single stage process by:
        1) preparing an initial aqueous mixture including formaldehyde and phenol, the formaldehyde-to-phenol mole ratio being from about 2.5:1 to 4.2:1;
        2) maintaining the aqueous mixture at a first temperature of from about 40° C. to 50° C. while adding a basic polymerization catalyst;
        3) permitting the temperature of the aqueous mixture to rise to a second temperature between from about 60° C. and 80° C.;
        4) maintaining the aqueous mixture at the second temperature during reaction of the phenol and formaldehyde to form the water-soluble phenol-formaldehyde resole resin until the free formaldehyde content of the aqueous mixture drops to a predefined level, the predefined level being about 40 percent by weight of the free formaldehyde in the initial aqueous mixture;
        5) cooling the aqueous mixture to a third temperature between 20° C. and 30° C.; and
        6) neutralizing the aqueous mixture to a pH of from about 7.2 to 7.6;
    b) preparing an aqueous reaction mixture including the phenol-formaldehyde resole resin, urea, and ammonia, the phenol-formaldehyde resole resin being prepared by a basic process not including an acid-catalyzed step, the weight ratio of ammonia to the resin solids of the unmodified resole resin being from about 1.0:100 to 3.0:100, the mole ratio of the urea to the free formaldehyde of the phenol-formaldehyde resin being from about 1:1 to 1.75:1;
    c) permitting the urea to react with the phenol-formaldehyde resole resin in the presence of the ammonia by waiting at least about 30 minutes after mixing the urea and the resole resin, the aqueous reaction mixture being agitated for at least a time sufficient to ensure complete mixing of the resole resin, the urea, and the ammonia, the aqueous mixture being maintained at a temperature of from about 5° C. to 30° C. while permitting the urea to react with the resole resin in the presence of the ammonia to form a modified resin; and d) subsequently completing preparation of the binder by adding a catalyst for curing the modified resole resin, a mineral oil lubricant, and an organo-silane adhesion promoter to the aqueous mixture.

13. A product prepared by the process of claim 12.

14. A single stage process for preparing a modified water-soluble phenol-formaldehyde resole resin, the process comprising:
   a) preparing an initial aqueous mixture including formaldehyde and phenol;
   b) maintaining the aqueous mixture at a first temperature of from about 40° C. to 50° C. while adding a basic polymerization catalyst;
   c) permitting the temperature of the aqueous mixture to rise to a second temperature between from about 60° C. to 80° C.;
   d) maintaining the aqueous mixture at the second temperature during reaction of the phenol and formaldehyde to form the water-soluble phenol-formaldehyde resole resin until the free formaldehyde content of the aqueous mixture drops to a predefined level;
   e) cooling the aqueous mixture to a third temperature between 20° C. and 30° C.; and,
   f) neutralizing the aqueous mixture;
   g) preparing an aqueous reaction mixture including the phenol-formaldehyde resole resin, urea, and ammonia, the phenol-formaldehyde resole resin being prepared by a basic process of not including an acid-catalyzed step; the weight ratio of ammonia to the resin solids of the unmodified resole resin being from about 1.0:100 to 3.0:100; and
   h) permitting the urea to react with the phenol-formaldehyde resole resin in the presence of the ammonia by waiting at least about 30 minutes after mixing the urea and the resole to form a modified resin.

15. A product prepared according to the process of claim 14.

* * * * *